US008116259B2

(12) United States Patent
Rofougaran

(10) Patent No.: US 8,116,259 B2
(45) Date of Patent: *Feb. 14, 2012

(54) METHOD AND SYSTEM FOR DIVERSITY PROCESSING BASED ON ANTENNA SWITCHING

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 830 days.

This patent is subject to a terminal disclaimer.

(21) Appl. No.: 11/536,666

(22) Filed: Sep. 29, 2006

(65) Prior Publication Data

US 2008/0080452 A1    Apr. 3, 2008

(51) Int. Cl.
*H04J 3/08* (2006.01)
(52) U.S. Cl. .................................. 370/326; 375/347
(58) Field of Classification Search .......... 370/310–350; 375/299, 347; 455/553.1, 132
See application file for complete search history.

(56) References Cited

U.S. PATENT DOCUMENTS

| 4,689,803 | A | | 8/1987 | Johnnessen |
| 5,052,049 | A | | 9/1991 | Andros |
| 5,191,598 | A | * | 3/1993 | Backstrom et al. ............ 375/347 |
| 5,475,581 | A | | 12/1995 | Lansberry |
| 6,301,231 | B1 | * | 10/2001 | Hassan et al. ................. 370/316 |
| 6,594,241 | B1 | | 7/2003 | Malmlof |
| 6,842,440 | B2 | * | 1/2005 | Paneth et al. ................. 370/330 |
| 6,937,592 | B1 | * | 8/2005 | Heath et al. ................... 370/342 |
| 7,142,833 | B2 | | 11/2006 | Hibino |
| 7,260,424 | B2 | | 8/2007 | Schmidt |
| 7,295,822 | B2 | | 11/2007 | Sano |
| 7,426,373 | B2 | | 9/2008 | Clingman |
| 2003/0054772 | A1 | | 3/2003 | Majaniemi |
| 2003/0169706 | A1 | | 9/2003 | Poegel et al. |
| 2003/0193923 | A1 | | 10/2003 | Abdelgany |
| 2004/0131014 | A1 | * | 7/2004 | Thompson et al. ........... 370/230 |
| 2004/0147289 | A1 | * | 7/2004 | Paljug et al. ............... 455/562.1 |
| 2004/0196813 | A1 | * | 10/2004 | Ofek et al. .................... 370/334 |
| 2004/0252060 | A1 | * | 12/2004 | Matsubara et al. ..... 343/700 MS |
| 2005/0136933 | A1 | * | 6/2005 | Sandhu et al. ................ 455/450 |
| 2005/0176436 | A1 | | 8/2005 | Mantravadi |
| 2005/0180375 | A1 | * | 8/2005 | Batra et al. .................... 370/344 |
| 2005/0197086 | A1 | | 9/2005 | Ogawa et al. |
| 2005/0245202 | A1 | | 11/2005 | Ranta |
| 2005/0266811 | A1 | | 12/2005 | Weiss |
| 2006/0023666 | A1 | * | 2/2006 | Jalali et al. .................... 370/334 |

(Continued)

FOREIGN PATENT DOCUMENTS

DE             4111847 A1    10/1991

(Continued)

*Primary Examiner* — Steven Lim
(74) *Attorney, Agent, or Firm* — Farjami & Farjami LLP

(57) ABSTRACT

Methods and systems for diversity processing based on antenna switching are disclosed. Aspects of one method may include switching among a plurality of antennas in a multi-antenna wireless terminal to receive packets. An antenna may receive a number of packets before switching to another antenna, where the number of packets may be pre-determined or dynamically determined. The received packets may be diversity processed where portions of a plurality of the received packets may be combined to form a single data packet. Similarly, antenna switching may also be used to transmit packets. For example, a data packet may be apportioned to a plurality of packets, and each of those packets may be transmitted via the antennas. Accordingly, if the number of packets to transmit is one, each antenna may transmit one packet, and the antenna switching may select another antenna with which to transmit a packet.

30 Claims, 7 Drawing Sheets

U.S. PATENT DOCUMENTS

| | | |
|---|---|---|
| 2006/0093067 A1 * | 5/2006 | Jalali et al. .................. 375/299 |
| 2006/0281423 A1 | 12/2006 | Caimi et al. |
| 2007/0030918 A1 | 2/2007 | Kobayashi |
| 2007/0032238 A1 | 2/2007 | Kim |
| 2007/0242773 A1 | 10/2007 | Li |
| 2008/0080418 A1 | 4/2008 | Rofougaran |
| 2008/0080452 A1 | 4/2008 | Rofougaran |

FOREIGN PATENT DOCUMENTS

| | | |
|---|---|---|
| EP | 1198078 A | 4/2002 |
| JP | 2006180453 | 7/2006 |
| KR | 20010078104 | 8/2001 |
| KR | 20030006051 | 1/2003 |
| WO | WO 2006/029082 | 3/2006 |
| WO | WO2006029082 | 3/2006 |

* cited by examiner

METHOD AND SYSTEM FOR DIVERSITY PROCESSING BASED ON ANTENNA SWITCHING

CROSS-REFERENCE TO RELATED APPLICATIONS/INCORPORATION BY REFERENCE

This application makes reference to:

U.S. application Ser. No. 11/536,678, filed on Sep. 29, 2006;
U.S. application Ser. No. 11/536,682, filed on Sep. 29, 2006;
U.S. application Ser. No. 11/536,650, filed on Sep. 29, 2006;
U.S. application Ser. No. 11/536,644, filed on Sep. 29, 2006;
U.S. application Ser. No. 11/536,676, filed on Sep. 29, 2006;
U.S. application Ser. No. 11/536,659, filed on Sep. 29, 2006;
U.S. application Ser. No. 11/536,673, filed on Sep. 29, 2006;
U.S. application Ser. No. 11/536,679, filed on Sep. 29, 2006;
U.S. application Ser. No. 11/536,670, filed on Sep. 29, 2006;
U.S. application Ser. No. 11/536,672, filed on Sep. 29, 2006;
U.S. application Ser. No. 11/536,648, filed on Sep. 29, 2006;
U.S. application Ser. No. 11/536,669, filed on Sep. 29, 2006;
U.S. application Ser. No. 11/536,675, filed on Sep. 29, 2006;
U.S. application Ser. No. 11/536,685, filed on Sep. 29, 2006;
U.S. application Ser. No. 11/536,645, filed on Sep. 29, 2006;
U.S. application Ser. No. 11/536,655, filed on Sep. 29, 2006;
U.S. application Ser. No. 11/536,660, filed on Sep. 29, 2006;
U.S. application Ser. No. 11/536,657, filed on Sep. 29, 2006;
U.S. application Ser. No. 11/536,662, filed on Sep. 29, 2006;
U.S. application Ser. No. 11/536,688, filed on Sep. 29, 2006;
U.S. application Ser. No. 11/536,667, filed on Sep. 29, 2006;
U.S. application Ser. No. 11/536,651, filed on Sep. 29, 2006;
U.S. application Ser. No. 11/536,656, filed on Sep. 29, 2006; and
U.S. application Ser. No. 11/536,663, filed on Sep. 29, 2006.

Each of the above stated applications is hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for diversity processing based on antenna switching.

BACKGROUND OF THE INVENTION

Wireless devices use one or more antennas to receive RF signals. However, signals received by an antenna may be affected by a transmission path taken by the signals, as well as by characteristics of the receive antenna. For example, the transmission path may comprise obstacles, such as, for example, buildings and/or trees that reflect and/or attenuate transmitted signals. In addition to obstacles in the transmission path, a receive antenna may also not be tuned to receive the frequencies for the desired channel. For example, actual receive circuitry may deviate from the designed receive circuitry due to tolerances of real-world devices and/or manufacturing deviations. Additionally, the receive antenna may also receive interfering signals in the desired channel that may reduce the signal-to-noise ratio, thereby increasing the difficulty of demodulating the desired signal. If the interfering signals are strong enough, the receiving wireless device may not be able to properly receive and de-modulate the received signal.

Some designs may use multiple antennas for reception and/or transmission, where the multiple antennas may each communicate received RF signals to RF front ends, and where each multiple antenna may transmit at the same time. However, these multiple antenna systems require the use of multiple RF transmit and/or receive processing chains, which increases the cost of the wireless device. Additionally, the simultaneous transmission via multiple antennas and simultaneous operation of the plurality of RF front ends requires additional power consumption, which is generally undesirable, especially for mobile applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for diversity processing based on antenna switching, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for diversity processing based on antenna switching. Aspects of the method may comprise switching among a plurality of antennas in a multi-antenna wireless terminal to receive packets. An antenna may receive a determined number of packets before switching to another antenna. The number of packets that may be received before switching may be pre-determined or may be dynamically determined. Accordingly, each antenna may receive a specified number of packets before being switched to the next antenna. The number of packets to be received by an antenna before switching may be determined by, for example, signal to noise ratio (SNR), received signal strength indication (RSSI), and/or bit error rate (BER) for an antenna. The received packets may be stored within a receiver for diversity processing. For example, the packets received via the different antennas may be sorted and stored in order. Diversity processing may also comprise combining portions of a plurality of the received packets to form a single data packet. Diversity processing may also be based on, for example, Viterbi algorithm and/or minimum mean square error algorithm.

In another embodiment of the invention, antenna switching may also be used to transmit packets. For example, a data packet may be apportioned to a plurality of packets, and each of those packets may be transmitted via the antennas. Accordingly, if the specified number of packets to transmit is one, each antenna may transmit one packet, and antenna switching may select another antenna with which to transmit. In other words, if there are two antennas and the specified number is one, the successive packets may be transmitted by alternating transmission between the two antennas. The antenna that is switched to, and therefore is receiving or transmitting, may be reconfigured such that it may operate via at least one of a plurality of different center frequencies within a specified range.

Figure 1:
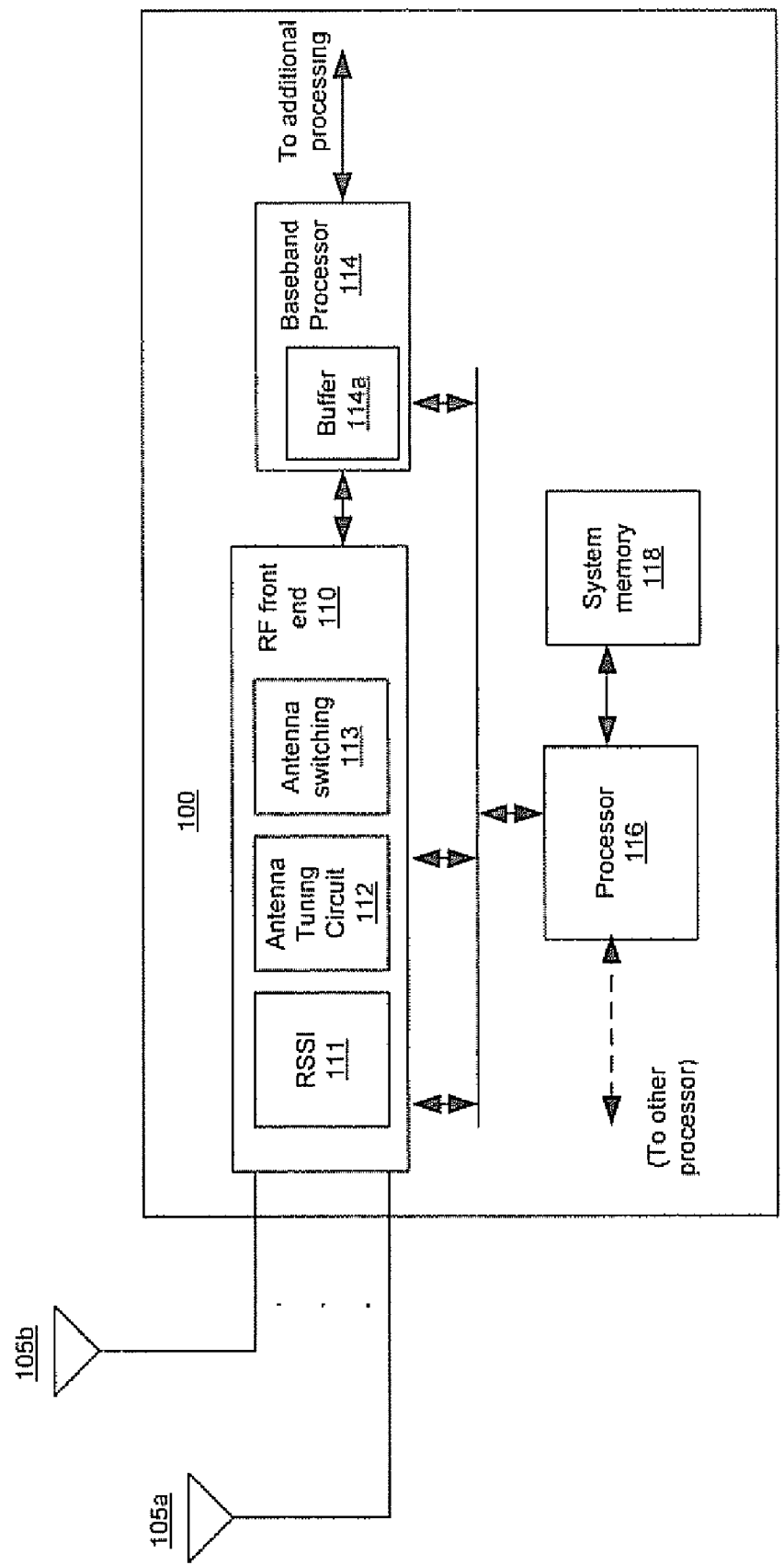
FIG. 1 is a block diagram of a wireless terminal, in accordance with an embodiment of the invention.

FIG. 1 is a block diagram of an exemplary wireless terminal, in accordance with an embodiment of the invention. Referring to FIG. 1, there is shown a wireless terminal 100, which may comprise, for example, a plurality of antennas 105a . . . 105b, a RF front end 110, a baseband processor 114, a processor 116, and a system memory 118. The RF front end 110 may comprise suitable logic, circuitry, and/or code that may be adapted to process received RF signals and/or RF signals to be transmitted. The RF front end 110 may be coupled to the antenna 105 for signal reception and/or transmission. The RF front end 110 may comprise an RSSI circuit 111, an antenna tuning circuit block 112, and an antenna switching block 113. The RSSI circuit 111 may comprise suitable logic, circuitry, and/or code that may be adapted to enable generation of received signal strength. The antenna tuning circuit block 112 may comprise suitable logic, circuitry, and/or code that may be adapted to adjust a center frequency for one of the antennas 105a . . . 105b that may be in use. An exemplary description of dynamic tuning of an antenna is disclosed in U.S. patent application Ser. No. 11/536,678, which is filed on Sep. 29, 2006 and is incorporated by reference in its entirety. The antenna switching block 113 may comprise suitable logic, circuitry, and/or code that may be adapted to select one of the antennas 105a . . . 105b for reception or transmission of RF signals.

With respect to received signals, the RF front end 110 may demodulate the received signals before further processing. Moreover, the RF front end 110 may comprise other exemplary functions, such as, filtering the received signal, amplifying the received signals, and/or downconverting the received signals to very low intermediate frequency (VLIF) signal and/or baseband signal. The RF front end 110 may comprise a IF processor which may digitize an IF signal, and digitally process the digitized IF signal to filter and/or downconvert the digitized IF signal to a digital baseband signal. The IF processor may then convert the digitized baseband signal to an analog baseband signal.

The RF front end 110 may also receive digital or analog baseband signals from, for example, the baseband processor 114. For example, the baseband processor 114 may generate one ore more signals that may be communicated to the RF front end 110, which may be utilized to control one or more functions executed by the RF front 110. Accordingly, in one embodiment of the invention, one or more signals generated by the baseband processor 114 and/or processor 116 may be utilized to program various components such as, for example, filters, phase lock loops (PLLs) or synthesizers, in the RF front end 110. The RF front end 110 may appropriately filter, amplify, and/or modulate an analog signal for transmission via the antenna 105. The RF front end 110 may also convert a digital signal to an analog signal as part of processing for transmission.

The baseband processor 114 may comprise suitable logic, circuitry, and/or code that may be adapted to process analog or digital baseband signals generated by the RF front end 110. The baseband processor 114 may also communicate baseband signals to the RF front end 110 for processing before transmission. The baseband processor 114 may also comprise a buffer 114a that may be used to store received data and/or data to be transmitted. The processor 116 may comprise suitable logic, circuitry, and/or code that may be adapted to control the operations of the RF front end 110, the antenna tuning circuit 112, the antenna switching block 113, and/or the baseband processor 114. For example, the processor 116 may be utilized to update and/or modify programmable parameters and/or values in a plurality of components, devices, and/or processing elements in the RF front end 110, the antenna tuning circuit 112, the antenna switching block 113, and/or the baseband processor 114. Exemplary programmable parameters may comprise gain of an amplifier, bandwidth of a filter, PLL parameters, and/or selection of an antenna for the antenna switching block 113. Control and/or data information may be transferred from another controller and/or processor in the wireless terminal 100 to the processor 116. Similarly, the processor 116 may transfer control and/or data information to another controller and/or processor in the wireless terminal 100.

The processor 116 may utilize the received control and/or data information to determine the mode of operation of the RF front end 110. For example, the processor 116 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 118 via the controller/processor 116. This information stored in system memory 118 may be transferred to the RF front end 110 from the system memory 118 via the controller/processor 116.

The system memory 118 may comprise suitable logic, circuitry, and/or code that may be adapted to store a plurality of control and/or data information, including parameters needed to calculate frequencies and/or gain, and/or the frequency value and/or gain value. The system memory 118 may also store, for example, various parameters for antenna hopping. The antenna hopping parameters may comprise, for example, various antenna tuning circuit parameters to determine center frequencies and bandwidths of the antenna 105, as well as impedance match the antenna 105 to the RF front end 110. An exemplary description of antenna hopping is disclosed further in U.S. patent application Ser. No. 11/536,682, which is filed on Sep. 29, 2006 and is incorporated by reference in its entirety.

In operation, RF signals may be received by the wireless terminal 100 via the antenna 105a . . . 105b. The wireless terminal 100 may receive digital data, such as, for example, packets, via the antennas 105a . . . 105b by switching antennas such that at any given time, one of the antennas 105a . . . 105b may provide received packets to the RF front end 110. When the wireless terminal 100 is transmitting, the baseband processor 114 may communicate a packet to the RF front end 110. Accordingly, the RF front end 110 may communicate a packet to the presently switched antenna. After the baseband processor 114 communicates the packet to the RF front end 110, the baseband processor 114 may configure the antenna switching block 113 to switch to another antenna. Accordingly, each antenna may transmit a packet at a time. In other exemplary embodiments of the invention, each antenna may transmit another specified number of packets before switching to another antenna.

The number of packets to be received by an antenna may be different for each antenna. For example, if the antenna 105a has a higher SNR, or a higher RSSI, than the antenna 105b, the antenna 105a may receive more packets than the antenna 105a before switching to the other antenna. The number of packets to be received by an antenna before switching to another antenna may also depend on a bit error rate (BER) for data received from that antenna. For example, if the baseband processor determines that the BER for packets received from the antenna 105a is lower than the BER for packets received from the antenna 105b, more packets may be received from the antenna 105a than from the antenna 105b before switching to the other antenna. Accordingly, the number of packets to be received by an antenna before switching to another antenna may be pre-determined or dynamically changed.

The antenna tuning circuit 112 may present an impedance to the antenna 105, and accordingly, the antenna 105 in conjunction with the antenna tuning circuit 112 may have a center frequency and a bandwidth about the center frequency. The antenna tuning circuit 112 may also impedance match the antenna 105 to the RF front end 110. Accordingly, the antenna 105 may present optimal reception for those signals within the bandwidth.

However, various environmental conditions may cause the center frequency to drift from the desired center frequency. For example, if the wireless terminal 100 is a mobile terminal, the inductive or capacitive characteristics of a user's hand holding the mobile terminal may change the center frequency. The wireless terminal 100 may detect the center frequency drift and may dynamically configure the antenna tuning circuit block 112 in order to bring the center frequency closer to a desired center frequency. The RF front end 110, which may receive weak signals at the desired frequencies, may be enabled to detect the center frequency drift, for example. The center frequency drift may also be detected, for example, by processing the received signals. For example, the baseband processor 114 may detect an increase in bit error rate of the received packets, which may be indicative of center frequency drift.

The signal strength indication and/or bit error rate may be communicated to the processor 116, and the processor 116 may determine that the antenna tuning circuit block 112 may need to be reconfigured. Accordingly, the processor 116 may communicate appropriate control and/or data to the antenna tuning circuit block 112 to reconfigure and/or retune the antenna tuning circuit block 112. By processing information regarding the received signals, the processor 116 may dynamically adjust the center frequency in order to reduce the effects of center frequency drift. The processor 116 may also reconfigure the antenna tuning circuit block 112 to adjust the bandwidth of the antenna 105 and/or impedance matching of the antenna 105 and the RF front end 110.

While FIG. 1 may have been described as communicating to at least one other processor or controller, the invention need not be so limited. Accordingly, there may be instances when the processor 116 may not have to communicate with other processors in controlling RF communications. For example, a design of the wireless terminal may not utilize other processors than the processor 116 or the processor 116 may have access to all information needed to control REF communications. Additionally, the RSSI circuit 111 may have been shown as part of the RF front end 110. The invention need not be so limited. For example, the RSSI circuit 111 may be before the RF front end 110, part of the RF front end 110, and/or after the RF front end 110.

Figure 2A:
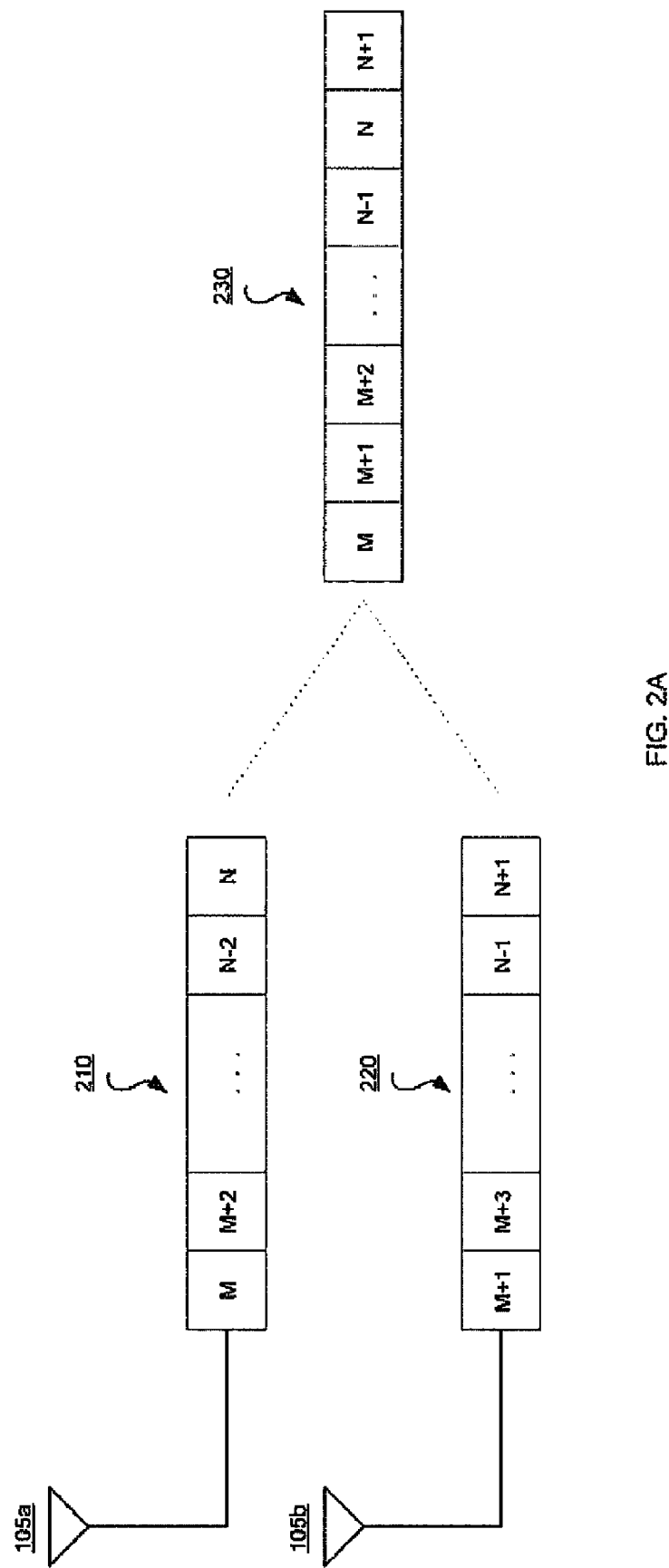
FIG. 2A is a diagram illustrating exemplary antenna switching, in accordance with an embodiment of the invention.

FIG. 2A is a block diagram illustrating exemplary antenna switching, in accordance with an embodiment of the invention. Referring to FIG. 2A, there is shown the antennas 105a and 105b, packet streams 210 and 220, and combined packet stream 230. The packet stream 210 may be received by, for example, the antenna 105a and the packet stream 220 may be received by, for example, the antenna 105b. For example, the antenna switching block 113 may be configured to select input from the antenna 105a, and therefore may receive packet M. After receiving the packet M, the antenna switching block 113 may be configured by, for example, the baseband processor 114 or the processor 116 to receive input from the antenna 105b. Accordingly, packet M+1 may be received from the antenna 105b. The antenna switching block may then be configured to receive the next packet, for example, packet M+2, from the antenna 105a.

By receiving alternating packets from the antenna 105a and 105b, the packet stream 210 may comprise packets M, M+2 . . . N−2, and N, and the packet stream 220 may comprise packets M+1, M+3 . . . N−1, and N+1. The packets received may be stored, for example, in the buffer 114a or the system memory 118. The packets from the packet streams 210 and 220 may be stored in order to form the packet stream 230.

Accordingly, the packet stream 230 may comprise the packets M, M+1, M+2, M+3, . . . , N−2, N−1, N, and N+1. The packets in the packet stream 230 may be processed by, for example, the baseband processor 114 and/or the processor 116 to retrieve baseband information.

Similarly, when transmitting data, packets from the combined packet stream 230 may be communicated to the RF front end 110, where the packet may be communicated to one of the antennas 105a . . . 105b. Accordingly, if the packets are transmitted via the antennas 105a and 105b, the antenna 105a may transmit the packet stream 210 and the antenna 105b may transmit the packet stream 220. The baseband processor 114 may antenna switch, for example, after communicating one packet to the RF front end 110 or after receiving a packet. However, the invention need not be so limited. For example, antenna switching may occur after a plurality of packets.

Figure 2B:
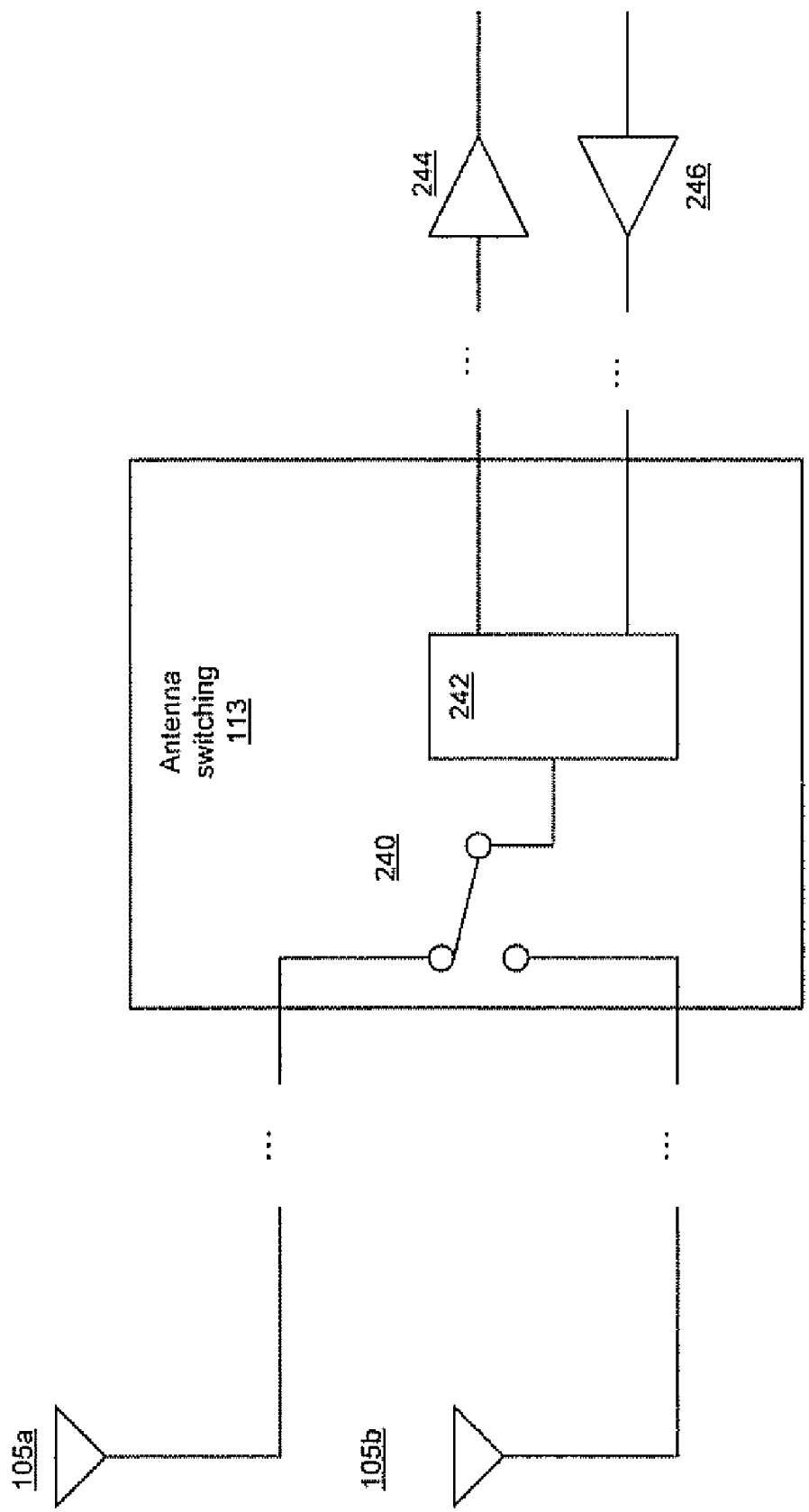
FIG. 2B is a block diagram illustrating exemplary antenna switching, in accordance with an embodiment of the invention.

FIG. 2B is a block diagram illustrating exemplary antenna switching, in accordance with an embodiment of the invention. Referring to FIG. 2B, there is shown the antennas 105a and 105b, the antenna switching block 113, a low noise amplifier (LNA) 244, and a power amplifier 246. The antenna switching block 113 may comprise a switch 240 and a diplexer 242. The switch 240 may comprise suitable logic, circuitry, and/or code that may enable the LNA 244 to receive data from either the antenna 105a or the antenna 105b. Similarly, the switch 240 may enable transmission of data from the power amplifier 246 to either the antenna 105a or the antenna 105b. The switch 240 may be configured by signals from, for example, the baseband processor 114 and/or the processor 116.

The diplexer 242 may comprise suitable logic, circuitry, and/or code that may enable, for example, isolating the LNA 244 from the power amplifier 246. The diplexer 242 may also couple the power amplifier 246 to the switch 240 during transmission mode for the wireless terminal 100, and couple the LNA 244 to the switch 240 during receive mode for the wireless terminal 100. Accordingly, the LNA 244 may be protected from damage by the high power signal from the power amplifier 246 when the power amplifier 246 is transmitting. When the wireless terminal 100 is in receive mode, the LNA 244 may be isolated from the noise that may be generated by the power amplifier 246.

While the antenna switching block 113 may have been illustrated for a 2-antenna system, the invention need not be so limited. For example, the number of antennas used for a wireless terminal 100 may be design dependent.

Figure 3:
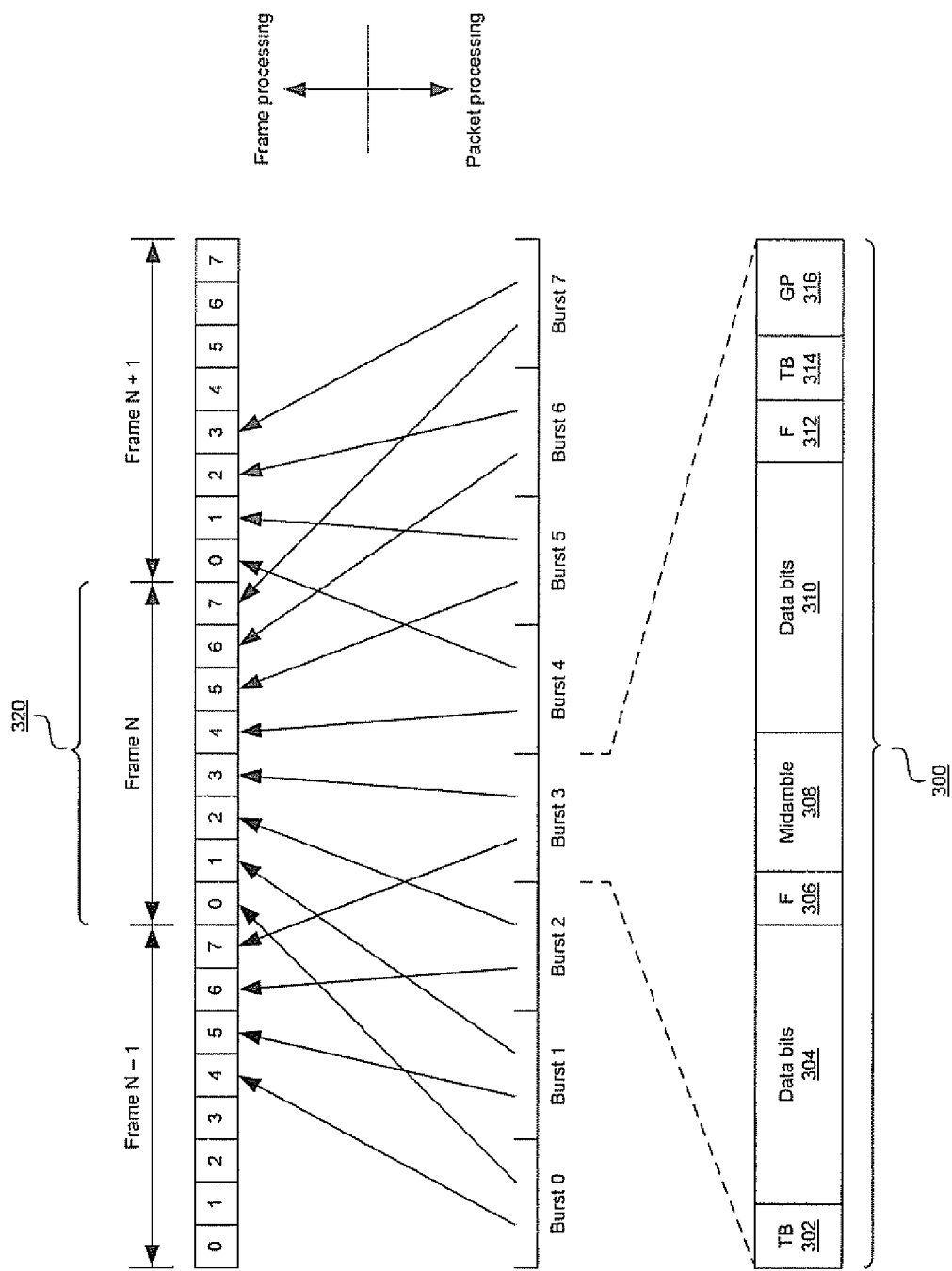
FIG. 3 is a diagram illustrating exemplary diversity processing, in accordance with an embodiment of the invention.

FIG. 3 is a diagram illustrating exemplary diversity processing, in accordance with an embodiment of the invention. Referring to FIG. 3, there is shown a series of at least one packet 300 and a series of at least one frame 320. The series of at least one packet 300, as shown, may correspond to Packet 0 through Packet 7, while the series of at least one frame 320, as shown, may correspond to Frame N−1 through Frame N+1. The packet 300 may comprise a tail bit (TB) 302, first data bits 304, a flag bit (F) 306, a midamble 308, second data bits 310, a flag bit (F) 312, a tail bit (TB) 314, and guard bits (GP) 316. The TB 302 and the TB 314 may comprise 3 bits each. The first data bits 304 and the second data bits 310 may comprise 57 bits each. The F 306 and the F 312 flag bits may comprise 1 bit each. The midamble 308 may comprise 26 bits and may be utilized as a training sequence for channel equalization, for example. The frame 320 may comprise eight partitions or sequences of bits.

As shown, the first data bits 304 in the Packet 0 through Packet 3 may be transferred to the fifth, sixth, seventh, and eight sequences of the Frame N−1 respectively, for example.

The first data bits 304 in the Packet 4 through Packet 7 may be transferred to the fifth, sixth, seventh, and eight sequences of the Frame N respectively, for example. The second data bits 310 in the Packet 0 through Packet 3 may be transferred to the first, second, third, and fourth sequences of the Frame N respectively, for example. The second data bits 310 in the Packet 4 through Packet 7 may be transferred to the first, second, third, and fourth sequences of the Frame N+1 respectively, for example. The diversity processing of bit sequences transferred from the packets to the frames may be performed by utilizing, for example, Viterbi algorithm and/or minimum mean square error (MMSE) algorithm to reduce the number of sequences utilized during the decoding search.

Figure 4:
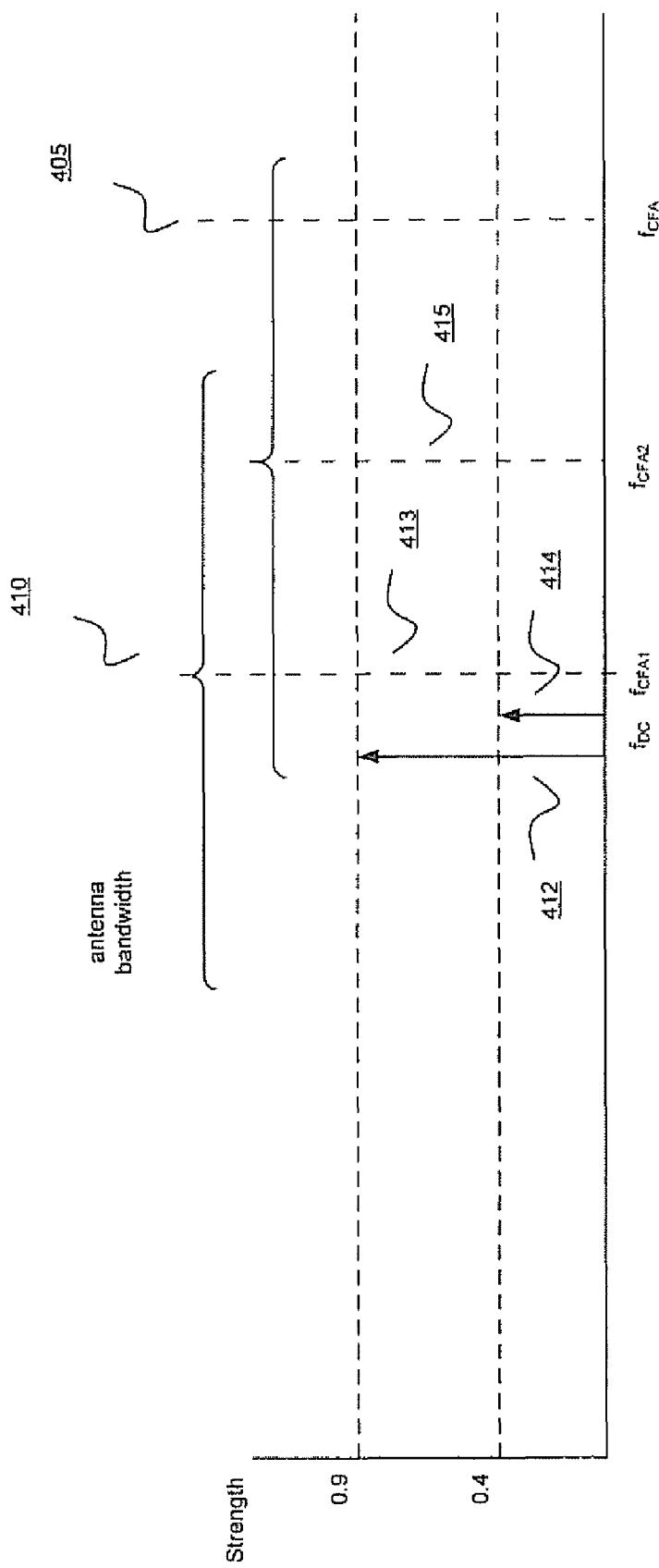
FIG. 4 is a chart illustrating exemplary signal strengths for a channel as a center frequency is changed due to antenna hopping, in accordance with an embodiment of the invention.

FIG. 4 is a chart illustrating exemplary signal strengths for a channel as a center frequency is changed due to antenna hopping, in accordance with an embodiment of the invention. Referring to FIG. 4, there is shown a chart where the horizontal axis indicates frequency and the vertical axis indicates signal strength. If there is a frequency offset between the desired channel and the center frequency of, for example, the antenna 105a, the wireless terminal 100 may not be able to determine the frequency offset. Accordingly, in an embodiment of the invention, after switching to an antenna, for example, the antenna 105a, the wireless terminal 100 may antenna hop by tuning the antenna 105a to change the center frequency of the antenna 105a to various frequencies.

For example, the desired channel frequency, and the desired center frequency, may be at the frequency $f_{DC}$ while the actual center frequency may have drifted to, for example, actual center frequency 405 of $f_{CFA}$. While the wireless terminal 100 may have no indication that the actual center frequency 405 is a different frequency than the desired center frequency, an antenna hopping algorithm may still be applied. Accordingly, signals for the desired channel may be received for various center frequencies. For example, the first antenna hop may configure the antenna tuning circuit 112 to a center frequency 413 at the frequency $f_{CA1}$. Since the center frequency 413 may be close to the desired channel frequency $f_{DC}$, the signal strength 412 for the desired channel for the center frequency $f_{CA1}$ may be a normalized value of 0.9.

The next antenna hop may configure the antenna tuning circuit 112 to a center frequency 415 at the frequency $f_{CA2}$. Since the center frequency 415 may be further away from the desired channel frequency $f_{DC}$ than the center frequency 413 may be from the desired channel frequency $f_{DC}$, the signal strength 414 for the desired channel for the center frequency $f_{CA2}$ may be at a smaller normalized value of 0.4. Antenna hops may be configured so that adjacent antenna bandwidths may overlap. For example, the antenna bandwidth associated with the center frequency 413 may overlap a portion of the antenna bandwidth associated with the center frequency 415.

In this manner, the wireless terminal 100 may be able to receive signals for the desired channel from different center frequencies associated with the antenna 105a at various times. Accordingly, the wireless terminal 100 may be able to compensate for center frequency drift without knowing the specific amount of drift.

Figure 5:
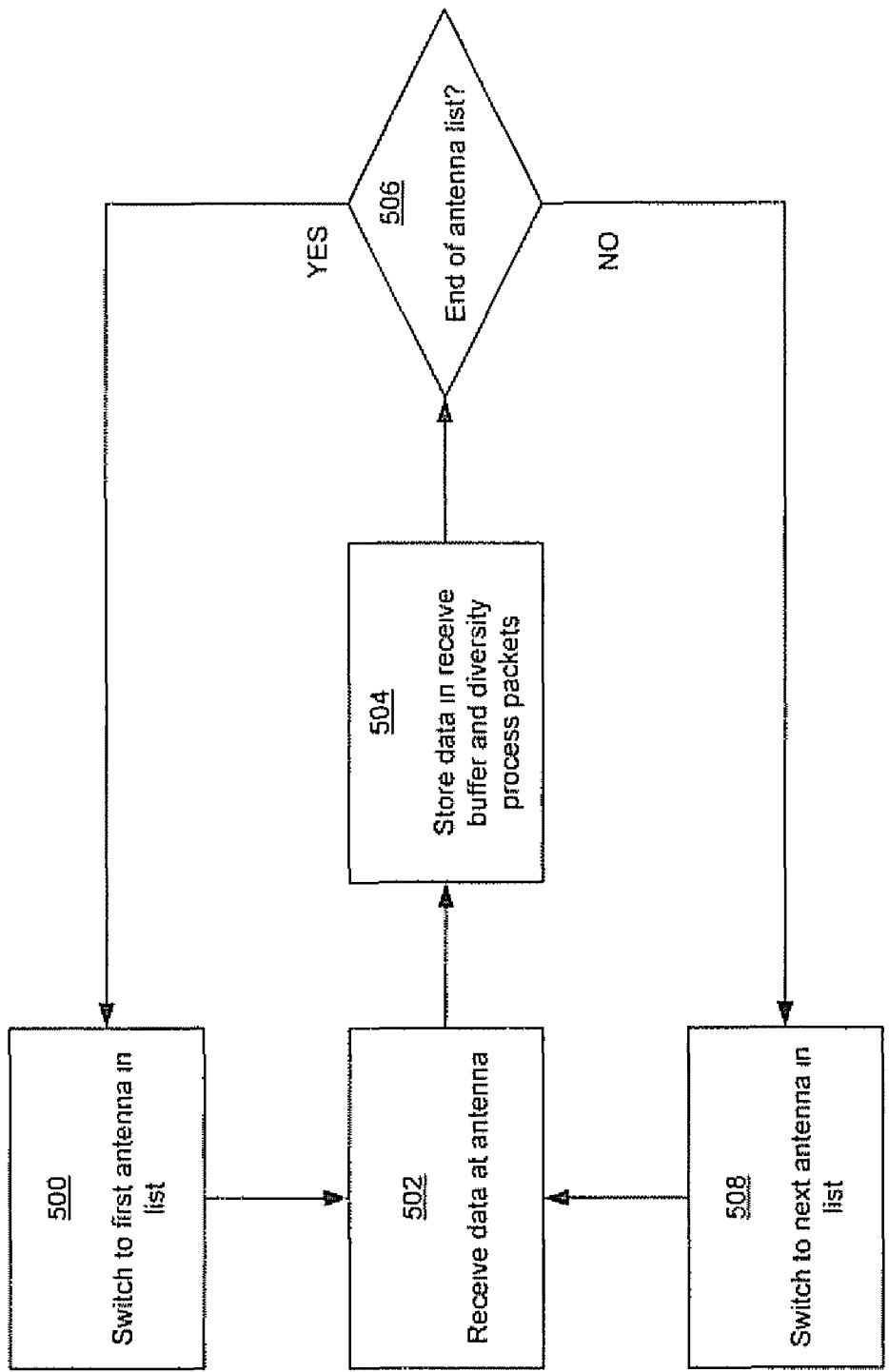
FIG. 5 is a flow diagram of exemplary steps for receiving data using antenna switching, in accordance with an embodiment of the invention.

FIG. 5 is a flow diagram of exemplary steps for receiving data using antenna switching, in accordance with an embodiment of the invention. Referring to FIG. 5, there is shown steps 500 to 508. In step 500, the antenna switching block 113 may select the antenna 105a to be coupled to the RF front end 110, where the antenna 105a may be first in the list of the antennas 105a . . . 105b. The baseband processor 114 or the processor 116, for example, may communicate to the antenna switching block 113 to switch to select the appropriate antenna. In step 502, the selected antenna may receive RF signals. The RF signals may be communicated to the baseband processor 114 via the RF front end 100. The baseband processor 114 may process the received signal to generate packets. In step 504, the generated packets may be stored in, for example, the buffer 114a. The baseband processor 114 may then further process the stored packets to generate, for example, a data packet as illustrated with respect to FIG. 3. For example, portions of a plurality of packets may be used to generate a data packet.

In step 506, the baseband processor 114, for example, may determine whether the current antenna receiving RF signals may be the last antenna in the list of antennas 105a . . . 105b. If so, the next step may be step 500. Otherwise, the next step may be step 508. In step 508, the baseband processor 114, for example, may provide a switching indicator to the antenna switching block 113, which may cause the switching block 113 to switch to the next antenna in the list of antennas 105a . . . 105b.

Figure 6:
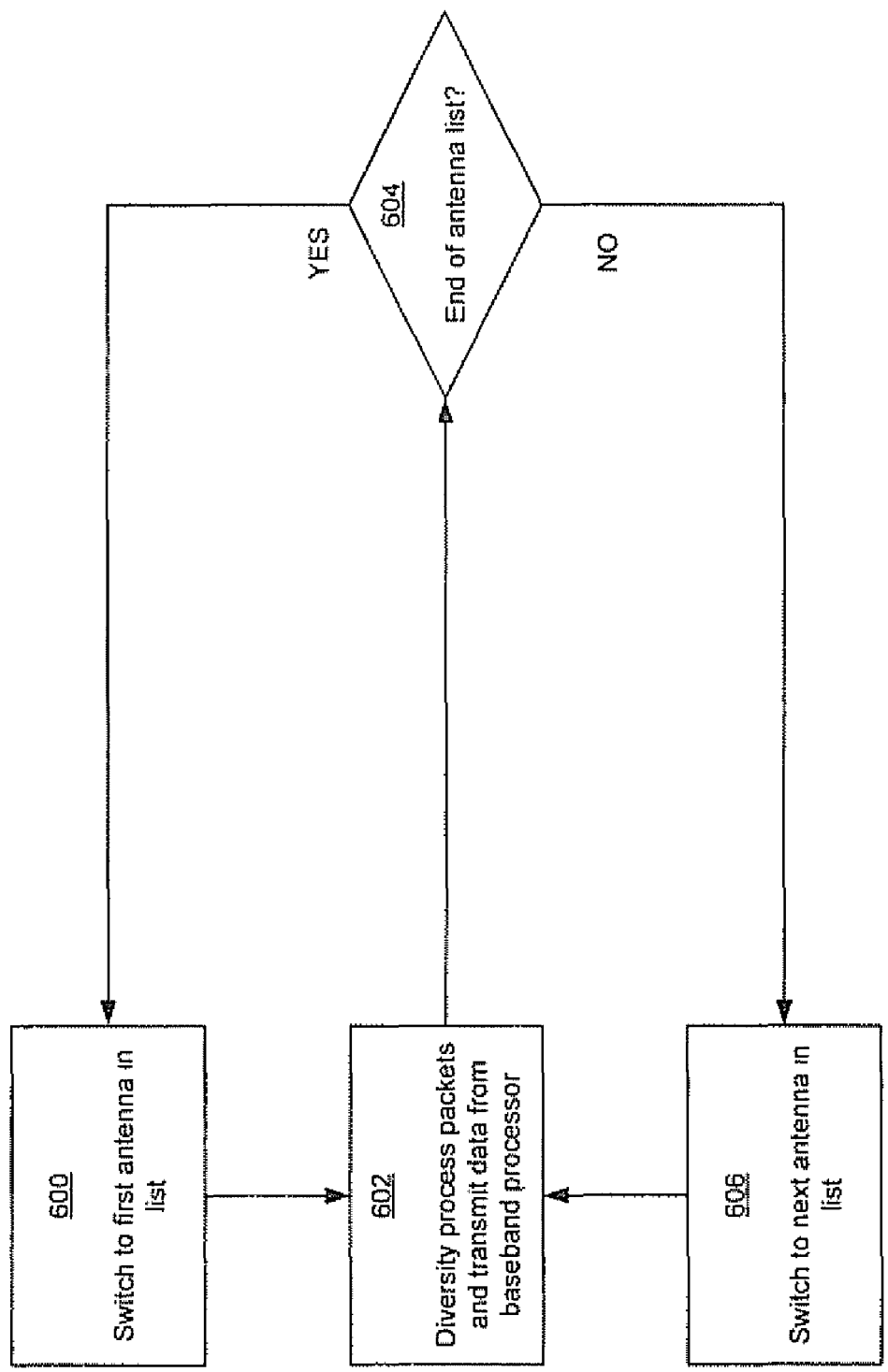
FIG. 6 is a flow diagram of exemplary steps for transmitting data using antenna switching, in accordance with an embodiment of the invention.

FIG. 6 is a flow diagram of exemplary steps for transmitting data using antenna switching, in accordance with an embodiment of the invention. Referring to FIG. 6, there is shown steps 600 to 606. In step 600, the antenna switching block 113 may select the antenna 105a to be coupled to the RF front end 110, where the antenna 105a may be first in the list of the antennas 105a . . . 105b. The baseband processor 114 or the processor 116, for example, may communicate to the antenna switching block 113 to switch to select the appropriate antenna. In step 602, the selected antenna may transmit a packet, where the packet may have been communicated by the baseband processor 114 via the RF front end 110. The baseband processor 114 may have generated the packet communicated to the selected antenna from a plurality of data packets, as illustrated with respect to FIG. 3, for example. In step 604, the baseband processor 114 may, for example, determine whether the current antenna receiving RF signals may be the last antenna in the list of antennas 105a . . . 105b. If so, the next step may be step 600. Otherwise, the next step may be step 606. In step 606, the baseband processor 114, for example, may provide a switching indicator to the antenna switching block 113, which may cause the switching block 113 to switch to the next antenna in the list of antennas 105a . . . 105b.

In accordance with an embodiment of the invention, aspects of an exemplary system may comprise the antenna switching block 113 that enables switching among the antennas 105a . . . 105b in a wireless terminal 100. The antennas 105a . . . 105b may receive successive packets where each antenna may receive a specified number of packets. The specified number of packets may be one or more packets. The received packets may be stored, for example, in the buffer 114a. The stored packets may be diversity processed by the baseband processor 114 to, for example, combine the plurality of received packets. For example, portions of received packets may be combined to form one data packet. The data packet may be similar, for example, to the packet 300.

Similarly, the baseband processor 114 may apportion a data packet to be transmitted to a plurality of packets, as illustrated with respect to FIG. 3, and each of the plurality of packets may be communicated to the RF front end 110. The RF front end 110 may process the packets to generate RF signals, and the RF signals may be communicated to the antenna 105a or 105b. The baseband processor 114 may switch antennas after communicating a specified number of packets. While an antenna may be selected, the antenna tuning circuit 112 may reconfigure that antenna to operate via at least one of a plurality of different center frequencies within a specified range.

Some embodiments of the invention may have been described where diversity processing may comprise receiving packets via a plurality of antennas. For example, every other packet may be received by the antenna 105a and the remaining packets by the antenna 105b. Accordingly, the receiving wireless terminal 100 may sort the received packets and store the received packets in order in, for example, the buffer 114a. The packets stored in the buffer 114a may be further processed, for example, to generate a data packet from portions of a plurality of the stored packets. However, the invention need not be so limited. For example, diversity processing may comprise just sorting the received packets. Other embodiments of the invention may implement diversity processing that may use, for example, other schemes for interleaving data and/or forward error correction. Diversity processing may be based on, for example, the Viterbi algorithm and/or the minimum mean square error algorithm. The specific diversity processing method that may require a plurality of packets may be design dependent.

Another embodiment of the invention may provide a machine-readable storage, having stored thereon, a computer program having at least one code section executable by a machine, thereby causing the machine to perform the steps as described above for diversity processing based on antenna switching.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for wireless communication, the method comprising:
   switching among a plurality of antennas in a multi-antenna terminal to receive a plurality of packets on a particular channel;
   while receiving a portion of said plurality of packets on said particular channel via a first one of said plurality of antennas, configuring said multi-antenna terminal among a plurality of different configurations, wherein a center frequency of said first one of said plurality of antennas is different for each of said configurations;

generating an aggregate received signal based on aggregation of signals received via said first one of said plurality of antennas for said plurality of different configurations;

recovering said portion of said plurality of packets from said aggregate received signal; and combining said portion of said plurality of packets with one or more other portions of said plurality of packets during diversity processing, said one or more other portions being received via another one or other ones of said plurality of antennas.

2. The method according to claim 1, comprising switching from one of said plurality of antennas to another of said plurality of antennas after receiving a packet.

3. The method according to claim 1, comprising switching from one of said plurality of antennas to another of said plurality of antennas after receiving multiple packets.

4. The method according to claim 1, comprising dynamically changing a number of said received packets that are received prior to switching from one of said plurality of antenna to another of said plurality of antennas.

5. The method according to claim 4, wherein said dynamically changing a number of said received packets that are received prior to said switching is based on at least one of: signal to noise ratio, received signal strength indication, and bit error rate.

6. The method according to claim 1, wherein at least a portion of each of said plurality of received packets is combined to a single packet.

7. The method according to claim 1, comprising buffering said portions and said one or more other portions of said plurality of packets for said diversity processing.

8. The method according to claim 1, comprising switching among said plurality of antennas in said multi-antenna terminal to transmit a plurality of packets.

9. The method according to claim 8, comprising apportioning data from a single data packet among a plurality of packets to be transmitted as said plurality of packets.

10. The method according to claim 1, comprising combining said portion and said one or more other portions of said plurality of packets during diversity processing based on at least one of: Viterbi algorithm and minimum mean square algorithm.

11. A non-transitory computer-readable medium having stored thereon, a computer program having at least one code section for wireless communication, the at least one code section being executable by a machine for causing the computer to perform steps comprising:

switching among a plurality of antennas in a multi-antenna terminal to receive a plurality of packets on a particular channel;

while receiving a portion of said plurality of packets on said particular channel via a first one of said plurality of antennas, configuring said multi-antenna terminal among a plurality of different configurations, wherein a center frequency of said first one of said plurality of antennas is different for each of said plurality of different configurations;

generating an aggregate received signal based on aggregation of signals received via said first one of said plurality of antennas for said plurality of different configurations;

recovering said portion of said plurality of packets from said aggregate received signal; and combining said portion of said plurality of packets with one or more other portions of said plurality of packets during diversity processing, said one or more other portions being received via another one or other ones of said plurality of antennas.

12. The non-transitory computer-readable medium according to claim 11, wherein said at least one code section comprises code for switching from one of said plurality of antennas to another of said plurality of antennas after receiving each packet of said plurality of packets.

13. The non-transitory computer-readable medium according to claim 11, wherein said at least one code section comprises code for switching from one of said plurality of antennas to another of said plurality of antennas after receiving multiple packets.

14. The non-transitory computer-readable medium according to claim 11, wherein said at least one code section comprises code for dynamically changing a number of said received packets that are received prior to switching from one of said plurality of antenna to another of said plurality of antennas.

15. The non-transitory computer-readable medium according to claim 14, wherein said dynamically changing a number of said received packets that are received prior to said switching is based on at least one of: signal to noise ratio, received signal strength indication, and bit error rate.

16. The non-transitory computer-readable medium according to claim 11, wherein at least a portion of each of said plurality of received packets is combined to a single packet.

17. The non-transitory computer-readable medium according to claim 11, wherein said at least one code section comprises code for buffering said portions and other portions of said plurality of packets for said diversity processing.

18. The non-transitory computer-readable medium according to claim 11, wherein said at least one code section comprises code for switching among said plurality of antennas in said multi-antenna terminal to transmit a plurality of packets.

19. The non-transitory computer-readable medium according to claim 18, wherein said at least one code section comprises code for apportioning data from a single data packet among a plurality of packets to transmit as said plurality of packets.

20. The non-transitory computer-readable medium according to claim 11, wherein said at least one code section comprises code for combining said portion and said one or more other portions of said plurality of packets during diversity processing based on at least one of: Viterbi algorithm and minimum mean square error algorithm.

21. A system for wireless communication, the system comprising:

one or more circuits for use in a multi-antenna wireless terminal, wherein said one or more circuits are operable to:

switch among a plurality of antennas in said multi-antenna terminal to receive a plurality of packets on a particular channel;

while said wireless terminal is receiving a portion of said plurality of packets on said particular channel via a first one of said plurality of antennas, configure said multi-antenna terminal among a plurality of configurations, wherein a center frequency of said first one of said plurality of antennas is different for each of said plurality of different configurations;

generate an aggregate received signal based on aggregation of signals received via said first one of said plurality of antennas for said plurality of different configurations;

recover said portion of said plurality of packets from said aggregate received signal; and combine said portion of said plurality of packets with one or more other portions of said plurality of packets during diversity processing, said one or more other portions being received via another one or other ones of said plurality of antennas.

22. The system according to claim 21, wherein said one or more circuits are operable to switch from one of said plurality of antennas to another of said plurality of antennas after receiving a packet.

23. The system according to claim 21, wherein said one or more circuits are operable to switch from one of said plurality of antennas to another of said plurality of antennas after receiving multiple packets.

24. The system according to claim 21, wherein said one or more circuits are operable to dynamically change a number of said received packets that are received prior to switching from one of said plurality of antenna to another of said plurality of antennas.

25. The system according to claim 24, wherein said dynamically changing a number of said received packets that are received prior to said switching is based on at least one of: signal to noise ratio, received signal strength indication, and bit error rate.

26. The system according to claim 21, wherein said one or more circuits are operable to combine at least a portion of each of said plurality of received packets to a single packet.

27. The system according to claim 21, wherein said one or more circuits are operable to buffer said portions and said other portions of said plurality of packets for said diversity processing.

28. The system according to claim 21, wherein said one or more circuits are operable to switch among said plurality of antennas in said multi-antenna terminal to transmit a plurality of packets.

29. The system according to claim 28, wherein said one or more circuits are operable to apportion data from a single data packet among a plurality of packets to transmit as said plurality of packets.

30. The system according to claim 21, wherein said wherein said one or more circuits are operable to combine said portion and said one or more other portions of said plurality of received packets during diversity processing based on at least one of: Viterbi algorithm and minimum mean square error algorithm.

* * * * *